Dec. 12, 1950     J. G. A. JOHNSON     2,533,263
APPARATUS AND METHOD FOR REMOVING EXCESS
MIXING WATER FROM PLASTIC CONCRETE
Filed March 24, 1947

WITNESSES:            INVENTOR.

Patented Dec. 12, 1950

2,533,263

UNITED STATES PATENT OFFICE 2,533,263

APPARATUS AND METHOD FOR REMOVING EXCESS MIXING WATER FROM PLASTIC CONCRETE

John Gunnar A. Johnson, New York, N. Y.

Application March 24, 1947, Serial No. 736,849

7 Claims. (Cl. 25—1)

My invention relates to a new method and apparatus for treating concrete soon after it is poured in place for hardening.

It is known that the quantity of mixing water generally required for the preparation of a plastic and placeable concrete mix is considerably more than is needed solely for the setting process of the cement. It is also known that the strength of concrete increases with the decrease in the quantity of mixing water relative to the cement content and that the strength increases with the density of the concrete. My invention relates to a new method and apparatus for removing a substantial part of the excess mixing water from a plastic concrete mix after it is poured but before the initial set of the cement and concurrently closing the voids left in the concrete mass by the extracted water. My proposed treatment produces a concrete which after hardening has increased density and strength and a decreased tendency to shrink and crack when drying out. My proposed treatment also makes possible earlier stripping of forms, use of structures and safe handling of precast concrete products in consequence of increased early strength and quicker drying.

My invention has therefore for its specific object to provide a method and apparatus by which a substantial portion of the mixing water, not required for the hydration of the cement, can be quickly extracted from the wet concrete mix by suction in combination with a simultaneous consolidation of the concrete mass by means of troweling, rodding or other vibratory action. My proposed apparatus is designed to create a rapid flow of air, induced by suction, through an enclosed compartment or chamber located above or inside a perforated plate, which is placed in contact with the freshly poured concrete. This rapid flow of air, entering the apparatus through a restricted and adjustable opening from the outside atmosphere, sweeps through the enclosed chamber over the perforated plate toward an outlet passage leading into a high vacuum line. This outlet passage is very small in relation to the sectional areas of the enclosed chamber and of the vacuum line in order to restrict the volume of the air flow and to increase the inrush velocity of the air into the vacuum line. The admission of air into the chamber from the outside atmosphere combined with the restricted outflow of air from the chamber into the vacuum line results in a considerably lower vacuum in the enclosed chamber than that employed in the primary vacuum line. A further reduction in the vacuum is effected at the underside of the perforated plate due to air leakage and losses produced by flow through the perforated plate and a screening material located at the bottom of the suction chamber. The resulting low suction which acts directly on the concrete is sufficient to move free water, brought to the surface of the concrete by a trowelling motion of the apparatus, through the perforations and the screening material into the suction chamber, where it is swept by the rapid flow of air toward and through the outlet opening into the primary vacuum line. It is to be noted that a low suction is employed and consequently such a low pressure is imposed on the concrete that the apparatus can be moved freely on the surface of or inside a concrete mass without appreciably adhering thereto.

Figure 1:
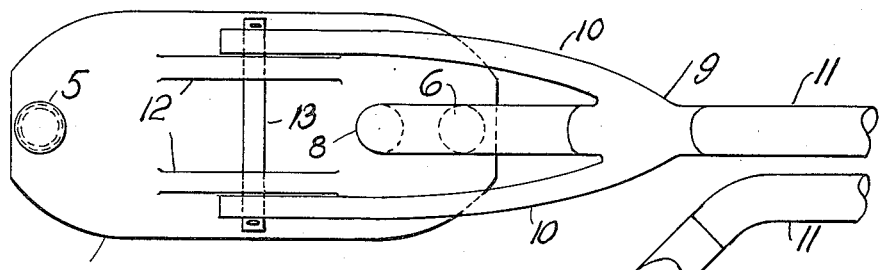
Figure 1 is a plan view of my preferred hand operated apparatus.

In the drawing where like reference characters represent corresponding parts 1 denotes the body of my preferred surface apparatus, which is preferably made of rigid steel or alloy construction, comprising an enclosed pump chamber 2 having its bottom perforated by countersunk holes 3, a porous material 4, preferably metal gauze, to screen the concrete aggregate and to substantially prevent any other substance but water to enter the chamber 2. At one end of the chamber 2 the air intake 5 is provided and at the opposite end of the chamber the air and water outlet 7, with a small opening into the vacuum line 6, is located close to the bottom of the chamber 2. A flexible hose 8 is shown connecting the outlet line 6 with the tubular handle 9, the other end of which is connected to the vacuum line 11 leading to a suction pump not shown on this drawing. The fork prongs 10 are pivot-connected to the lugs 12 by means of the shafting 13, which is provided with cotters as shown on the drawing.

Figures 3, 4:
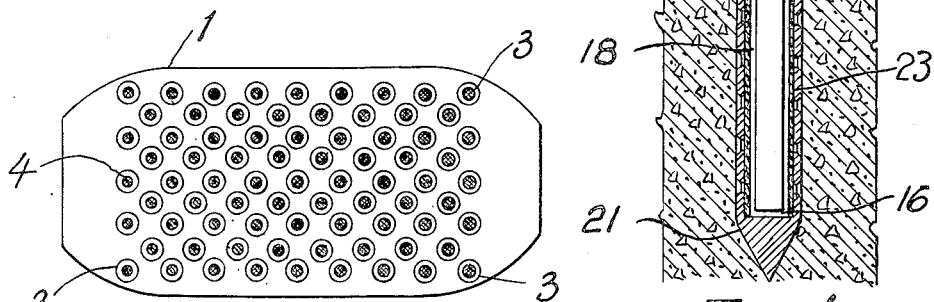
Figure 3 is a worm eye view of the perforated bottom thereof.
Figure 4 shows a modified form of my apparatus for interior treatment of deep concrete.

Figure 4 shows my preferred unwatering device for deep concrete such as wall construction and is composed of a tubular body 14, preferably made of steel tubing, having a pointed end 21 and a top collar 22 that is shown welded to the vacuum suction pipe 15, which reaches to the bottom of the tubular pump chamber 18. The air intake 19 is located at the top of pump chamber 18 and the air and water outlet 16, with one or more small openings into the suction pipe 15, is located close to the bottom of pump chamber 16. The outside tubular body 14, which is in contact with the concrete, is provided with the countersunk holes 17, through which the water enters from the concrete. Inside the pipe 14 the porous screen 23 is provided so that the water extracted from the concrete must pass through the screen before it enters the annular space 18 from which it is pumped out by suction from the vacuum line 15. The flexible vacuum transmission line 20 leads to a suction pump not shown on the drawing.

Figure 2:
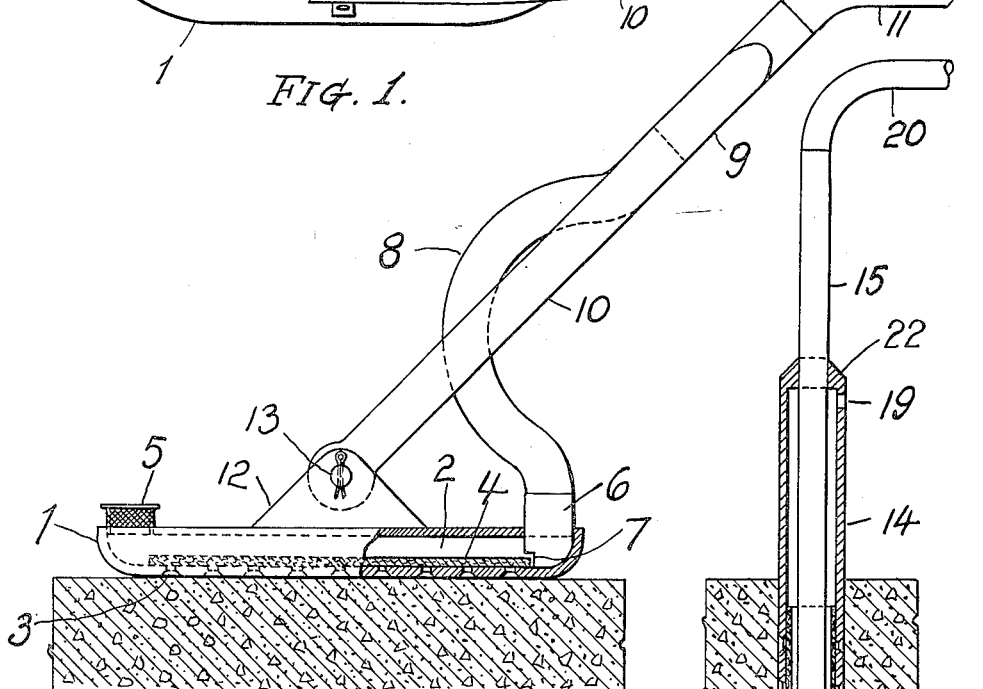
Figure 2 is a side elevation thereof with a fragmentary section thereof shown.

The operation of my apparatus for surface treatment of concrete shown in Figures 1, 2 and 3 is as follows: A concrete slab has been poured and directly following the screeding the operator slides the unwatering device back and forth over the surface of the concrete in order to solidify the mass and squeeze water to the surface. The suction employed on the underside of the apparatus is sufficient to carry the water through the perforated openings 3 into the pump chamber 2, where the water is blown toward the outlet 7 by the rapid air stream that flows through the chamber. The chamber 2 will operate with less than one inch of vacuum therein. The high or vacuum suction in the vacuum line 6 pulls the water off the bottom of the chamber 2 and the chamber therefore always remains practically free from water. Similarly the pump chamber 18 of my preferred plunger type tool, shown in Figure 4, stays practically empty of water as the suction in pipe 15 is sufficient to pick the water off the bottom of chamber 18.

In this connection I wish to comment on the importance of retaining the narrow outlet passages 7 and 19 into the respective vacuum lines 6 and 15 of my surface and plunger type dewatering tools. When air is sucked through a small opening the air velocity is sharply increased. Due to the high passage velocity of the air and water through the outlet opening, which acting as a nozzle substantially atomizes the water and transforms it into a spray of fog, the flow becomes essentially an air transmission. The suction in primary vacuum line will not be substantially reduced by the relatively small amount of air entering from the pump chambers 2 and 18. Therefore several of my preferred apparatuses can be operated from the same vacuum line, even if one or more of the tools are left open to the atmosphere, without excessive lowering of the suction.

Whereas in the foregoing specification I have described my unwatering devices as hand operated tools it is to be understood that mechanical means may be employed to effect the trowelling, rodding or other vibratory action needed to consolidate the concrete mass and convey excess mixing water within the suction range of my apparatus. It should also be noted that my apparatus can be adapted to utilize heated air for the rapid air stream that sweeps through the suction chambers 2 and 18 of my respective surface and interior unwatering devices in order to hasten the drying process. It is therefore to be understood that I do not limit my invention to the forms shown on the drawing as it is evident that alterations may be made in the mode of operations and in the construction of my device without departing from the spirit and scope of my invention.

Inasmuch as I use a combination of known elements to achieve a new and useful result I do not only claim the apparatus as part of my invention but also the method described in my specification.

What I claim is:

1. The method of removing excess mixing water from plastic concrete characterized by creating a low suction on the surface of the concrete to suck water through a screen into an enclosed chamber, creating an air current through the enclosed chamber to deliver the water directly to the suction end of a high vacuum line and admitting air in restricted quantities into the vacuum line so as to atomize the water and create a substantial spray transmission through the vacuum line.

2. The method of removing excess mixing water from plastic concrete characterized by creating a low suction on the surface of the concrete to suck water through a screen into an enclosed chamber, creating an air current through the enclosed chamber to deliver the water directly to the suction end of a high vacuum line and admitting air in restricted quantities into the vacuum line so as to atomize the water and create a substantial spray transmission through the vacuum line and concurrently consolidating the concrete mass by means of trowelling or other vibratory action through which the water is squeezed from the interstices between the concrete aggregates and brought within range of the suction action.

3. A tool adapted to be applied to the surface of a plastic concrete mass to remove excess mixing water from the concrete comprising an air chamber, a perforated bottom thereof adapted to contact and apply suction to the concrete, a screener preventing solid matter to enter the chamber, an air admission at one end of the chamber and a suction intake to a vacuum line at the other end with a small restricted passage close to the bottom of the chamber.

4. A tool adapted to be applied to the surface of a plastic concrete mass to remove excess mixing water from the concrete comprising an air chamber, a perforated bottom thereof adapted to contact and apply suction to the concrete, a screener preventing solid matter to enter the chamber, an air admission at one end of the chamber and a suction intake to a vacuum line at the other end with a small restricted passage close to the bottom of the chamber, said tool adapted to be concurrently operated on the surface of a plastic concrete mass in a trowelling or other vibratory action for the purpose of consolidating the concrete and bringing excess mixing water within the suction range of the tool.

5. Apparatus for drying and expediting the setting of wet concrete comprising a body enclosing a chamber, to make contact with the concrete, said body having an air intake port and an outlet port of restricted size, and inlet openings between said ports to admit water drawn from the concrete into the chamber, a screen over said openings to arrest particles of concrete, said body having an exhaust member communicating with said outlet port, so that when a high vacuum is created in said member, a lower vacuum results in the chamber, but the water therein is atomized at the outlet and expelled through the outlet in the form of a spray.

6. Apparatus for drying and expediting the setting of wet concrete comprising a body enclosing a chamber, to make contact with the concrete, said body having an air intake port and an outlet port of restricted size, and inlet openings between said ports to admit water drawn from the concrete into the chamber, a screen over said opening to arrest particles of concrete, said body having an exhaust member communicating with said outlet port, so that when a high vacuum is created in said member, a lower vacuum results in the chamber, but the water therein is atomized at the outlet and expelled through the outlet in the form of a spray, said body being tubular and closed at one end, to make contact with the concrete by insertion of said end into the mass thereof, the intake being at the outer end, and the inlet openings in the sides between the ends, the exhaust member extending into said body with its inner end open and in close proximity to the closed end, the outlet being formed by the space between the closed end of the body and the inner end of said member.

7. Apparatus for drying and expediting the setting of wet concrete comprising a body enclosing a chamber, to make contact with the concrete, said body having an air intake port and an outlet port of restricted size, and inlet openings between said ports to admit water drawn from the concrete into the chamber, a screen over said openings to arrest particles of concrete, said body having an exhaust member communicating with said outlet port, so that when a high vacuum is created in said member, a lower vacuum results in the chamber, but the water therein is atomized at the outlet and expelled through the outlet in the form of a spray, said body being flat with its bottom making contact with the concrete by resting thereon, the air intake and exhaust member being at the top, the member extending into the body and having a reduced inner end forming said outlet port, said air inlet openings being in the bottom.

J. GUNNAR A. JOHNSON.

REFERENCES CITED

The following references are of record in the file of this patent:

UNITED STATES PATENTS

| Number | Name | Date |
| --- | --- | --- |
| 1,989,409 | Gordon | Jan. 29, 1935 |